(12) United States Patent
Kottilingam et al.

(10) Patent No.: US 11,123,796 B2
(45) Date of Patent: Sep. 21, 2021

(54) METHOD OF MAKING A PRE-SINTERED PREFORM

(71) Applicant: GENERAL ELECTRIC COMPANY, Schenectady, NY (US)

(72) Inventors: Srikanth Chandrudu Kottilingam, Greenville, SC (US); Yan Cui, Greer, SC (US); Brian Lee Tollison, Honea Path, SC (US); David Edward Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 122 days.

(21) Appl. No.: 15/581,678

(22) Filed: Apr. 28, 2017

(65) Prior Publication Data
US 2018/0311728 A1    Nov. 1, 2018

(51) Int. Cl.
*B22F 10/10*      (2021.01)
*B22F 5/00*      (2006.01)
(Continued)

(52) U.S. Cl.
CPC .......... *B22F 10/10* (2021.01); *B22F 3/10* (2013.01); *B22F 3/1035* (2013.01); *B22F 5/009* (2013.01);
(Continued)

(58) Field of Classification Search
CPC ...... B22F 3/008; B22F 3/1021; B22F 3/1055; B22F 5/009; B22F 5/04; B22F 5/10;
(Continued)

(56) References Cited

U.S. PATENT DOCUMENTS

| 5,204,055 A | * | 4/1993 | Sachs | B05C 19/04 419/2 |
| 5,775,402 A | * | 7/1998 | Sachs | B22C 9/065 164/4.1 |

(Continued)

FOREIGN PATENT DOCUMENTS

WO    2004/007124 A1    1/2004
WO    WO-2015100084 A1 *   7/2015    ............. B33Y 10/00
(Continued)

OTHER PUBLICATIONS

A. B. Norton and H. W. Gillett, "The Approximate Melting Points of Some Commercial Copper Alloys," Bureau of Mines, Technical Paper 60, pp. 70-77, publication date unknown, document accessed Oct. 10, 2020. (Year: 2020).*

(Continued)

*Primary Examiner* — Vanessa T. Luk
(74) *Attorney, Agent, or Firm* — McNees Wallace & Nurick LLC

(57) ABSTRACT

A method of making a pre-sintered preform, including forming a pre-sintered preform by a binder jet additive manufacturing technique. The binder jet additive manufacturing technique includes depositing a first powder layer including a first powder and a second powder followed by depositing a first binder at a pre-determined location of the first powder layer. The binder jet additive manufacturing technique also includes depositing a second powder layer over at least a portion of the first powder layer followed by depositing a second binder at a pre-determined location of the second powder layer. At least a portion of the first binder and at least a portion of the second binder is cured forming a green part. The green part is then densified to form a pre-sintered preform near net shape component.

20 Claims, 3 Drawing Sheets

(51) Int. Cl.
*B22F 5/04* (2006.01)
*B33Y 10/00* (2015.01)
*B22F 3/10* (2006.01)
*B29C 64/165* (2017.01)
*B33Y 80/00* (2015.01)
*B22F 7/08* (2006.01)
*B22F 3/15* (2006.01)
*B22F 7/06* (2006.01)
*C22C 1/04* (2006.01)

(52) U.S. Cl.
CPC .............. *B22F 5/04* (2013.01); *B29C 64/165* (2017.08); *B22F 3/15* (2013.01); *B22F 7/062* (2013.01); *B22F 7/08* (2013.01); *B22F 2998/10* (2013.01); *B22F 2999/00* (2013.01); *B33Y 10/00* (2014.12); *B33Y 80/00* (2014.12); *C22C 1/0433* (2013.01)

(58) Field of Classification Search
CPC ...... B22F 7/02; B22F 7/04; B22F 7/06; B22F 7/062; B22F 7/064; B22F 7/08; B22F 2007/042; B22F 2007/045; B22F 2007/066; B22F 2007/068; B29C 64/112; B29C 64/153; B29C 64/165
See application file for complete search history.

(56) References Cited

U.S. PATENT DOCUMENTS

| | | | | |
|---|---|---|---|---|
| 6,596,224 | B1* | 7/2003 | Sachs ...................... | B22F 3/008 264/113 |
| 2005/0079086 | A1* | 4/2005 | Farr ...................... | B22F 1/0059 419/36 |
| 2015/0314530 | A1 | 11/2015 | Rogren | |
| 2015/0322820 | A1* | 11/2015 | Ott .......................... | F01D 25/24 415/208.1 |
| 2016/0158843 | A1* | 6/2016 | Yolton ...................... | B22F 3/15 419/6 |
| 2017/0014937 | A1* | 1/2017 | Wilhelmy .......... | B23K 35/3601 |
| 2017/0080497 | A1* | 3/2017 | Tuffile ...................... | B22F 3/26 |
| 2018/0099334 | A1* | 4/2018 | Peters .................. | B29C 64/153 |

FOREIGN PATENT DOCUMENTS

| | | | |
|---|---|---|---|
| WO | 2015/141779 A1 | 9/2015 | |
| WO | WO-2016061302 A1 * | 4/2016 | ................ B22F 5/10 |
| WO | WO-2016145397 A1 * | 9/2016 | ......... B23K 35/3601 |

OTHER PUBLICATIONS

Metal Material Data Sheet, 420 Stainless Steel, copyright 2017 by MatWeb, 6 pages. (Year: 2017).*
Extended European Search Report and Opinion issued in connection with corresponding EP Application No. 18169267.4 dated Aug. 2, 2018.
Yasa et al., "Benchmarking of Different Powder-Bed Metal Fusion Processes for Machine Selection in Additive Manufacturing" (2014), TUSAS Engine Industries.
Slotwinski, J.A. and Garboczi, E.J. "Metrology Needs for Metal Additive Manufacturing Powders" JOM (2015), vol. 67, Issue 3, pp. 538-543.
Seifi et al. "Overview of Materials Qualification Needs for Metal Additive Manufacturing" JOM (2016), vol. 68, Issue 3, pp. 747-764.
Putyra et al. "The analysis of strength properties of ceramic preforms for infiltration process" Archives of Materials Science and Engineering, (2008), vol. 33, Issue 2, pp. 97-100.

* cited by examiner

METHOD OF MAKING A PRE-SINTERED PREFORM

FIELD OF THE INVENTION

The present invention is directed to additive manufacturing techniques for the production of pre-sintered preforms and turbine components formed therefrom.

BACKGROUND OF THE INVENTION

Additive manufacturing is an attractive technique for the manufacture of custom parts in various industries. In a conventional additive technique a powder is bonded layer-by-layer by localized sintering/melting. The repeated thermal stresses imposed on the part during manufacture can reduce the mechanical properties and overall durability of the resulting part.

BRIEF DESCRIPTION OF THE INVENTION

An exemplary embodiment includes, a method of making a pre-sintered preform, by a binder jet additive manufacturing technique. The binder jet additive manufacturing technique includes depositing a first powder layer including a first powder and a second powder. A first binder is deposited a pre-determined location of the first powder layer. A second powder layer is deposited over at least a portion of the first powder layer. A second binder is deposited at a pre-determined location of the second powder layer. The first and second binders are at least partially cured to form a green part. The green part is densified to form a pre-sintered preform near net shape component.

An exemplary embodiment includes, a near net shape component including a densified binder jet deposited material having a first powder, a second powder, and a binder. The near net shape component includes a complex geometry.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of forming a pre-sintered preform and a turbine article formed therefrom. Embodiments of the present disclosure, for example, in comparison to the concepts failing to include one or more features disclosed herein, result in a pre-sintered preform having improved surface uniformity and reduced surface cracking.

The term green part as used herein defines a structure including metal and/or ceramic powders in which the powders are held together by a binder or mechanically (e.g., compacted) without the powder particles being directly bonded to one another. The term pre-sintered preform as used herein defines a structure including metal and/or ceramic powders in which the powders are held together by being directly bonded to one another. The term high melt powder as used herein defines the powder having the highest melting point of the powders of a powder layer. Additional powders of the powder layer are considered high melt powders if their melting points are within 200 degrees Celsius of the highest melting powder. The term low melt powder as used herein defines a powder having a melting point at least 200 degrees Celsius less than the highest melting powder of the powder layer.

Figure 1:
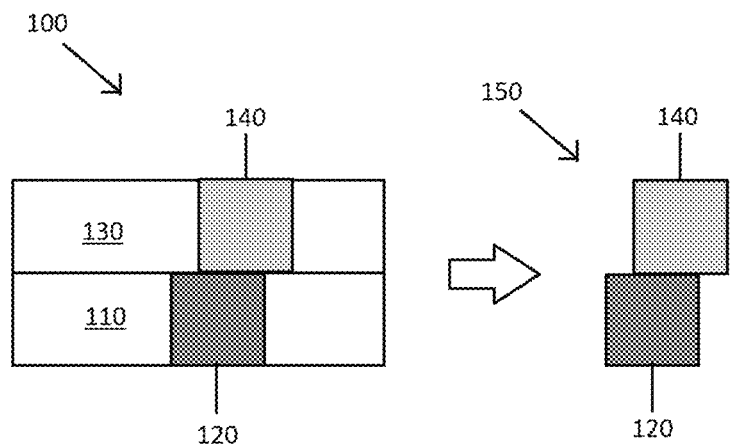
FIG. 1 is a schematic diagram of a powder article according to an embodiment.

An embodiment of a powder article 100 is shown in FIG. 1. In an example embodiment, the powder article 100 includes a powder article formed by a binder jet additive manufacturing technique. A first powder layer 110 including at least a first powder and a second powder is deposited. The powders of the first powder layer 110 may include metals (e.g., aluminum, chromium, cobalt, iron, magnesium, manganese, molybdenum, nickel, niobium, silicon, tantalum, titanium, tungsten, vanadium, and combinations thereof). In some embodiments, the metals of the first powder layer 110 may be provided as separate components. In some embodiments, the metals of the first powder layer 110 may be provided as alloys (e.g., Ti-6Al-4V, Ti—Al, Al—Si-10Mg, nickel superalloys (e.g., GTD 111, GTD 222, HASTALLOY X, HAYNES 230, Inconel 600, Inconel 625, Inconel 718, Inconel 738, Inconel 939, MAR-M-247, René 108, René N5, and combinations thereof), stainless steels (e.g., stainless steel 316, and/or stainless steel 420), and/or cobalt-chrome alloys (e.g., FSX 414, HAYNES 188, MAR-M-509, and combinations thereof). The materials of the first powder and the second powder are different. In some embodiments, the first powder has a melting point less than a melting point of the second powder. In some embodiments, the first powder and second powder may each be a high melt powder. In some embodiments, the first powder may be a low melt powder and the second powder may be a high melt powder. In some embodiments, the first powder layer 110 may include additional powders. In some embodiments, the mean particle size of the first and second powders may independently be greater than about 4.0 micrometers, greater than about 7.0 micrometers, greater than about 10.0 micrometers, greater than about 15.0 micrometers, greater than about 20.0 micrometers, less than about 100.0 micrometers, less than about 70.0 micrometers, less than about 50.0 micrometers, less than about 30.0 micrometers, and combinations thereof.

In the example of FIG. 1, a binder region 120 is formed in the first powder layer 110. A binder is deposited at a pre-determined location of the first powder layer 110 to form the first binder region 120. The binder interpenetrates at least a portion of the first powder layer 110 filling at least some of the interstitial spaces in the first powder layer 110. The binder provides cohesion between the powder particles within the first binder region 120. In some embodiments, the binder may be deposited as a solid, liquid, or melt. In other embodiments, the binder may be deposited as a solution. The binder of the first binder region 120 may be any binder compatible with the materials of the first powder layer 110. Suitable binders include but are not limited to thermoplastic resins (e.g., polyethylene, polypropylene, polyvinyl chloride, polycarbonate, and/or ethylene copolymers), thermoset resins (e.g., polyurethane, phenolic, polyimide, polyester, melamine and/or polycyanurate), and combinations thereof. Suitable solvents include but are not limited to 2-pyrrolidone, methanol, isopropyl alcohol, water, 1,5-pentanediol, ethylene glycol, triethylene glycol, and combinations thereof.

In the example of FIG. 1, a second powder layer 130 is deposited over at least a portion of the first powder layer 110 and at least a portion of the first binder region 120. The second powder layer 130 includes at least a third powder having a third melting point and a fourth powder having a fourth melting point. The third powder may be the same or different from the first powder and/or the second powder. The fourth powder may be the same or different from the first powder and/or the second powder. In some embodiments, the third powder may be the same as the first powder and the fourth powder may be the same as the second powder. Suitable third and fourth powder materials include those described above for the first and second powders. In some embodiments, the third powder and fourth powder may each be a high melt powder. In some embodiments, the third powder may be a low melt powder and the fourth powder may be a high melt powder. In some embodiments, the second powder layer 130 may include additional powders.

In the example of FIG. 1, a second binder region 140 is formed in the second powder layer 130 by depositing a second binder at a pre-determined location of the second powder layer 130. The binder interpenetrates at least a portion of the second powder layer 130 filling at least some of the interstitial spaces in the second powder layer 130. The binder provides cohesion between the powder particles within the second binder region 140. In some embodiments, the binder may be deposited as a solid, liquid, or melt. In other embodiments, the binder may be deposited as a solution. The second binder region 140 contacts at least a portion of the first binder region 120. The binder of the second binder region 140 may be any binder compatible with the materials of the second powder layer 130. The binder of the second binder region 140 may be the same or different as the binder the first binder region 120. In one embodiment, the binder of the first binder region 120 is the same as the binder of the second binder region 140. Suitable binders and solvents include those described above for the first binder region 120.

As the binder solidifies and/or cures the overlapping portions of the first binder region 120 and second binder region 140 are bound together to form a green part 150. In some embodiments, the binder may be at least partially cured by heating (e.g., microwave and/or thermal) and/or by the application of actinic radiation (e.g. visible light, and/or ultraviolet light). In some embodiments, additional depositions of powder layers and binder regions may be performed in order to form larger green part 150. In some embodiments, the binders of the green part 150 may be at least partially cured sequentially as the binder regions are deposited. In other embodiments, the binders of the green part 150 may be at least partially cured after the deposition of multiple binder regions. The number of additional layers/binder regions may be at least about 10, at least about 100, at least about 1000, at least about 5000, and/or at least about 10,000.

Following the at least partial curing of the binder regions the green part 150 may be heated (e.g., oven) to substantially fully cure the at least partially cured binder. Substantially fully curing the binder of the green part 150 allows for the green part 150 to be more easily physically manipulated during processing without damage.

The green part 150 may be densified to form a pre-sintered preform 160. Densification may enhance the mechanical, optical, and/or electrical properties of the pre-sintered preform 160 (e.g. hardness, fracture toughness, bending strength, abrasion resistance, thermal expansion, thermal conductivity, thermal shock resistance, thermal shock cycling).

The first powder layer 110 and/or the second powder layer 130 may optionally include one or more additives. In some embodiments, the one or more additives may be provided to improve a strength property of the resulting pre-sintered preform 160. Suitable additives include but are not limited to carbon nanoparticles (e.g., single wall carbon nanotubes, multi-wall carbon nanotubes, carbon nanofilaments, and combinations thereof) and/or ceramic fibers (e.g., silicon carbide, silicon nitride, alumina, aluminum nitride, titanium boride, titanium nitride, titanium carbide, boron carbide, and combinations thereof).

Techniques for densification include but are not limited to sintering, solutionizing, aging, and combinations thereof. In some embodiments, the densification includes sintering. The sintering temperature is dependent on the materials of the powder layers. In one embodiment, the sintering is performed at a temperature greater than the melting point of the first powder and less than the melting point of the second powder. In one embodiment, the sintering is performed at a temperature less than the melting point of the first powder and less than the melting point of the second powder. For example, $Al_2O_3Ti(C,N)$ may be initially sintered at a heating rate of about 500 to about 700 Kelvin per hour, a first temperature of about 850 to about 900 Kelvin for about 0.5 to about 2 hours, and a second temperature of about 1900 Kelvin to about 2000 Kelvin for about 0.5 to about 2 hours under reduced pressure (e.g., about $10^{-4}$ Torr). In some embodiments, the green part 150 may be densified by hot isostatic pressing (HIP). In an example embodiment, the green part 150 may be placed in a sealed furnace under an inert atmosphere (e.g., argon, nitrogen, and/or helium) and heated (e.g., between 480 degrees Celsius and 1320 degrees Celsius) under pressure (e.g., between 50 megapascal and 310 megapascal). Specific hot isostatic pressing conditions are dependent on the materials of the green part 150. In some embodiments, hot isostatic pressing may be performed as at least part of a sintering process. The binders of the green part 150 typically have decomposition temperatures below the sintering temperatures allowing substantially all of the binders to be removed from the green part 150 during densification.

In some embodiments, infiltration materials (e.g. copper alloys (e.g., copper-tin), nickel alloys (e.g., BNi-2, BNi-3, BNi-5, BNi-6, BNi-7, BNi-9, BNi-10, DF-4B, D15, and combinations thereof), cobalt alloys (e.g., Co-101, DF-4B, and combinations thereof), palladium alloys (e.g., BVPd-1, PD 201, and combinations thereof), carbon, magnesium oxide, yttrium oxide, cesium oxide, zirconium oxide, alumina, aluminum nitride, zirconium nitride, chromium nitride, and/or magnesium nitride) may be added during densification to further enhance the properties of the densified pre-sintered preform. Infiltration may be performed by various methods known in the art, including, but not limited to pressure assisted infiltration, vacuum driven infiltration, capillarity driven infiltration, and combinations thereof. In some embodiments, the resulting density of the pre-sintered preform 160 may be greater than about 95 percent, greater than about 97 percent, greater than about 98 percent, greater than about 99 percent, greater than about 99.5 percent, and/or greater than about 99.9 percent of the theoretical maximum density.

As used herein, "BNi-2" refers to an alloy including a composition, by weight, of about 3% iron, about 3.1% boron, about 4.5% silicon, about 7% chromium, and a balance of nickel.

As used herein, "BNi-3" refers to an alloy including a composition, by weight, of about 4.5% silicon, about 3% boron, and a balance of nickel.

As used herein, "BNi-5" refers to an alloy including a composition, by weight, of about 10% silicon, about 19% chromium, and a balance of nickel.

As used herein, "BNi-6" refers to an alloy including a composition, by weight, of about 11% phosphorous and a balance of nickel.

As used herein, "BNi-9" refers to an alloy including a composition, by weight, of about 15% chromium, about 3% boron, and a balance of nickel.

As used herein, "BNi-10" refers to an alloy including a composition, by weight, of about 11.5% chromium, about 3.5% silicon, about 2.5% boron, about 3.5% iron, about 0.5% carbon, about 16% tungsten, and a balance of nickel.

As used herein, "BCo-1" refers to an alloy including a composition, by weight, of about 19% chromium, about 17% nickel, about 8% silicon, about 0.8% boron, about 4% tungsten, and a balance of cobalt.

As used herein, "BVPd-1" refers to an alloy including a composition, by weight, of about 35% cobalt, and a balance of palladium.

As used herein, "Co-101" refers to an alloy including a composition, by weight, of about 19% chromium, about 8% silicon, about 0.8% boron, about 0.4% carbon, about 4% tungsten, and a balance of cobalt.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "D15" refers to an alloy including a composition, by weight, of about 15% chromium, about 10.25% cobalt, about 3.5% tantalum, about 3.5% aluminum, about 2.3% boron, and a balance of nickel.

As used herein, "FSX 414" refers to an alloy including a composition, by weight, of about 29% chromium, about 7% tungsten, about 10% nickel, about 0.6% carbon, and a balance of cobalt.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HASTELLOY X" refers to an alloy including a composition, by weight, of about 22% chromium, about 18% iron, about 9% molybdenum, about 1.5% cobalt, about 0.1% carbon, about 0.6% tungsten, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel.

As used herein, "INCONEL 100" refers to an alloy including a composition, by weight, of about 10% chromium, about 15% cobalt, about 3% molybdenum, about 4.7% titanium, about 5.5% aluminum, about 0.18% carbon, and a balance of nickel.

As used herein, "INCONEL 600" refers to an alloy including a composition, by weight, of about 15.5% chromium, about 8% iron, about 1% manganese, about 0.5% copper, about 0.5% silicon, about 0.15% carbon, and a balance of nickel.

As used herein, "INCONEL 625" refers to an alloy including a composition, by weight, of about 21.5% chromium, about 5% iron, about 9% molybdenum, about 3.65% niobium, about 1% cobalt, about 0.5% manganese, about 0.4% aluminum, about 0.4% titanium, about 0.5% silicon, about 0.1% carbon, and a balance of nickel.

As used herein, "INCONEL 718" refers to an alloy including a composition, by weight, of about 17% chromium, about 0.35 aluminum, about 2.80 molybdenum, about 0.65 titanium, about 4.75 niobium+tantalum, and a balance of nickel+cobalt (1% max of cobalt).

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "INCONEL 939" refers to an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel.

As used herein, "L605" refers to an alloy including a composition, by weight, of about 20% chromium, about 10% nickel, about 15% tungsten, about 0.1% carbon, and a balance of cobalt.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "MAR-M-509" refers to an alloy including a composition, by weight, of about 24% chromium, about 10% nickel, about 7% tungsten, about 3.5% tantalum, about 0.5% zirconium, about 0.6% carbon, and a balance of cobalt.

As used herein, "MAR-M-509B" refers to an alloy including a composition, by weight, of about 23.5% chromium, about 10% nickel, about 7% tungsten, about 3.5% tantalum, about 0.45% zirconium, about 2.9% boron, about 0.6% carbon, about 0.2% titanium, and a balance of cobalt.

As used herein, "PD-201" refers to an alloy including a composition, by weight, of about 40% nickel, and a balance of palladium.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "Stainless Steel 316" refers to an alloy including a composition, by weight, of about 16% chromium, about 10% nickel, about 2% molybdenum, and a balance of iron.

As used herein, "Stainless Steel 420" refers to an alloy including a composition, by weight, of about 13% chromium, at least 0.15% carbon, and a balance of iron.

Figure 2:
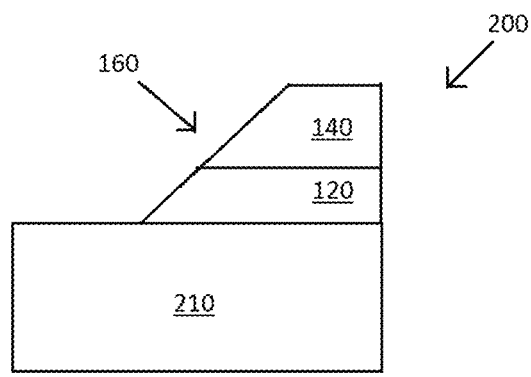
FIG. 2 is a schematic diagram of a turbine article according to an embodiment.

An embodiment of a turbine article 200 is shown in FIG. 2. The turbine article 200 includes the pre-sintered preform 160 and at least one turbine article component 210. The turbine article 200 may be formed by securing the pre-sintered preform 160 to the at least one turbine article component 210. Various techniques may be used to secure the pre-sintered preform 160 to the at least one turbine article component 210, including welding, mechanical, brazing, laser welding, friction welding, ultrasonic welding, additive manufacturing, and combinations thereof. In some embodiments, the turbine article 200 may be a turbine bucket, a turbine nozzle, a turbine shroud, an airfoil, and combinations thereof. In other embodiments, the turbine article 200 may itself be a further component of a turbine part such as a turbine nozzle, a turbine shroud, and/or an airfoil.

In some embodiments, the pre-sintered preform 160 may be a near net shape component. Near net shape components exit the manufacturing process substantially in the shape and/or configuration desired for use. Near net shape manufacturing may be used produce components having curved surfaces and complex geometries. Components manufactured to near net shape typically require little or no post fabrication processing (e.g., machining) prior to use, allowing material loss and/or wastage due to post fabrication processing to be reduced or eliminated.

Figure 3:
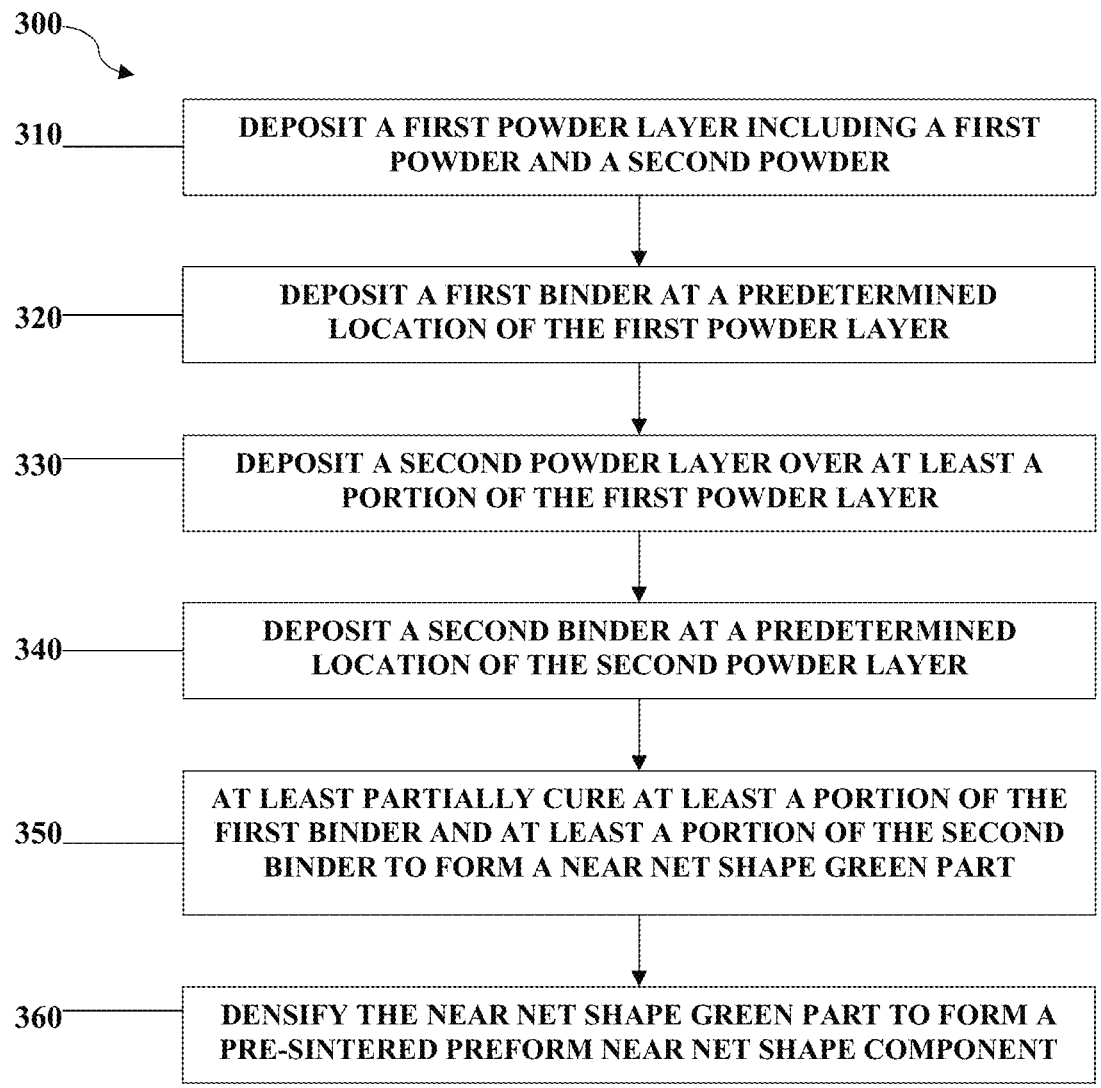
FIG. 3 is a flowchart of a method of making a pre-sintered preform according to an embodiment.

FIG. 3 is a flowchart of a method 300 of making the pre-sintered preform 160 including making a pre-sintered preform by a binder jet additive manufacturing technique. In the example of FIG. 3, at block 310, a first powder layer 110 including a first powder and a second powder is deposited. At block 320, a binder is deposited at a pre-determined location of the first powder layer to form the first binder region 120. At block 330, a second powder layer 130 is deposited over at least a portion of the first powder layer 110 and at least a portion of the first binder region 120. At block 340, a second binder is deposited at a pre-determined location of the second powder layer 130 to form a second binder region 140. The second binder region 140 at least partially overlaps the first binder region 120. At block 350, at least a portion of the binder is solidified to form a near net shape green part 150. At block 360, the near net shape green part 150 is densified forming the pre-sintered preform 160 near net shape component.

Figure 4:
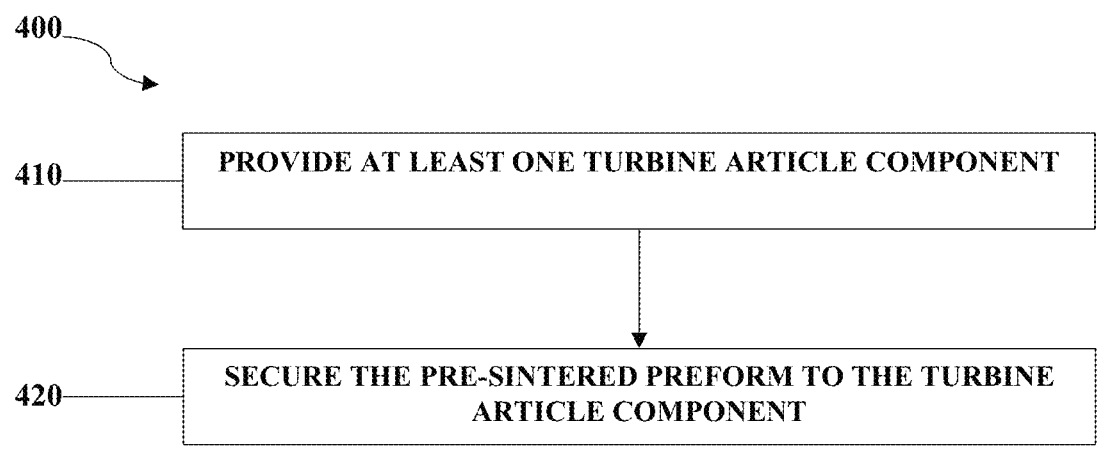
FIG. 4 is a flowchart of a method of making a turbine article according to an embodiment.

FIG. 4 is a flowchart of a method 400 of making the turbine article 200. In the example of FIG. 4, at block 410, the at least one turbine article component 210 is provided. At block 420, the at least one pre-sintered preform 160 is secured to the turbine article component 210 to form the turbine article 200.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of making a near net shape component, comprising in order:
    forming a near net shape component by a binder jet additive manufacturing technique, the binder jet additive manufacturing technique including:
        depositing a first powder layer including a first metal powder and a second metal powder, the second metal powder having a melting point at least 200° C. higher than the first metal powder;
        depositing a first binder at a pre-determined location of the first powder layer;
        depositing a second powder layer over at least a portion of the first powder layer;
        depositing a second binder at a pre-determined location of the second powder layer; and
        at least partially curing at least a portion of the first binder and at least a portion of the second binder to form a near net shape green part,
    wherein the second metal powder is selected from the group consisting of GTD 111, GTD 222, HASTELLOY X, HAYNES 230, Inconel 600, Inconel 625, Inconel 718, Inconel 738, Inconel 939, MAR-M-247, René 108, René N5, FSX 414, HAYNES 188, MAR-M-509, and combinations thereof.

2. The method of claim 1, further comprising densifying the green part to form a pre-sintered preform near net shape component of a turbine article.

3. A method of making a near net shape component, comprising in order:
    forming a near net shape component by a binder jet additive manufacturing technique, the binder jet additive manufacturing technique including:
        depositing a first powder layer including a first metal powder and a second metal powder, the second metal powder having a melting point at least 200° C. higher than the first metal powder;
        depositing a first binder at a pre-determined location of the first powder layer;
        depositing a second powder layer over at least a portion of the first powder layer;
        depositing a second binder at a pre-determined location of the second powder layer; and
        at least partially curing at least a portion of the first binder and at least a portion of the second binder to form a near net shape green part;
    wherein the second binder is different from the first binder, and
    wherein the second metal powder is selected from the group consisting of GTD 111, GTD 222, HASTELLOY X, HAYNES 230, Inconel 600, Inconel 625, Inconel 718, Inconel 738, Inconel 939, MAR-M-

247, René 108, René N5, FSX 414, HAYNES 188, MAR-M-509, and combinations thereof.

4. The method of claim 3, wherein the second powder layer includes a third powder; and wherein the third powder is different from the first metal powder and the second metal powder.

5. The method of claim 3, further comprising densifying the green part to form a pre-sintered preform near net shape component of a turbine article.

6. A method of making a near net shape component, comprising in order:
  forming a near net shape component by a binder jet additive manufacturing technique, the binder jet additive manufacturing technique including:
    depositing a first powder layer including a first metal powder and a second metal powder, the second metal powder having a melting point at least 200° C. higher than the first metal powder;
    depositing a first binder at a pre-determined location of the first powder layer;
    depositing a second powder layer including a third powder over at least a portion of the first powder layer;
    depositing a second binder at a pre-determined location of the second powder layer; and
    at least partially curing at least a portion of the first binder and at least a portion of the second binder to form a near net shape green part;
  wherein the third powder is different from the first metal powder and the second metal powder, and
  wherein the second metal powder is selected from the group consisting of GTD 111, GTD 222, HASTELLOY X, HAYNES 230, Inconel 600, Inconel 625, Inconel 718, Inconel 738, Inconel 939, MAR-M-247, René 108, René N5, FSX 414, HAYNES 188, MAR-M-509, and combinations thereof.

7. The method of claim 6, further comprising densifying the green part to form a pre-sintered preform near net shape component.

8. The method of claim 7, further comprising assembling a turbine article, the assembling a turbine article including securing the pre-sintered preform near net shape component to a turbine article component to form the turbine article.

9. The method of claim 8, wherein the turbine article is selected from the group consisting of a turbine bucket, a turbine nozzle, a turbine shroud, an airfoil, and combinations thereof.

10. The method of claim 8, wherein the securing the pre-sintered preform near net shape component comprises welding, mechanical, brazing, laser welding, friction welding, ultrasonic welding, additive manufacturing, and combinations thereof.

11. The method of claim 7, further comprising configuring the pre-sintered preform near net shape component to allow a fluid flow through the pre-sintered preform near net shape component.

12. The method of claim 7, wherein the pre-sintered preform near net shape component is selected from the group consisting of a turbine bucket, a turbine nozzle, a turbine shroud, an airfoil, and combinations thereof.

13. The method of claim 7, wherein densifying the green part includes sintering, solutionizing, aging, and combinations thereof.

14. The method of claim 13, wherein the densifying includes sintering.

15. The method of claim 6, further comprising infiltrating the green part with an infiltration material.

16. The method of claim 15, wherein the infiltration material is selected from the group consisting of copper alloys, nickel alloys, cobalt alloys, and palladium alloys.

17. The method of claim 6, further comprising heating the green part to a temperature above the melting point of the first metal powder and below the melting point of the second metal powder.

18. The method of claim 6, wherein the first powder layer further includes carbon nanoparticles or ceramic fibers.

19. The method of claim 18, wherein the first powder layer includes the carbon nanoparticles; and wherein the carbon nanoparticles include at least one of single wall carbon nanotubes, multi-wall carbon nanotubes, or carbon nanofibers.

20. The method of claim 18, wherein the first powder layer includes the ceramic fibers; and wherein the ceramic fibers include at least one of silicon carbide, silicon nitride, alumina, aluminum nitride, titanium boride, titanium nitride, titanium carbide, or boron carbide.

* * * * *